US011145876B2

United States Patent
Kobayashi et al.

(10) Patent No.: US 11,145,876 B2
(45) Date of Patent: Oct. 12, 2021

(54) CARBON CATALYST, CELL ELECTRODE, AND CELL

(71) Applicant: NISSHINBO HOLDINGS INC., Tokyo (JP)

(72) Inventors: Yoshikazu Kobayashi, Chiba (JP); Yuji Kubota, Chiba (JP); Tetsutaro Sato, Kisarazu (JP); Takeaki Kishimoto, Funabashi (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 149 days.

(21) Appl. No.: 16/629,538

(22) PCT Filed: Jul. 3, 2018

(86) PCT No.: PCT/JP2018/025249
§ 371 (c)(1),
(2) Date: Jan. 8, 2020

(87) PCT Pub. No.: WO2019/013051
PCT Pub. Date: Jan. 17, 2019

(65) Prior Publication Data
US 2020/0243873 A1    Jul. 30, 2020

(30) Foreign Application Priority Data
Jul. 13, 2017  (JP) .............................. JP2017-137457

(51) Int. Cl.
*H01M 8/04* (2016.01)
*H01M 4/92* (2006.01)
(Continued)

(52) U.S. Cl.
CPC ............. *H01M 4/926* (2013.01); *B01J 21/18* (2013.01); *B01J 27/24* (2013.01); *B01J 35/10* (2013.01); *H01M 12/08* (2013.01)

(58) Field of Classification Search
CPC ...................................................... H01M 8/04
See application file for complete search history.

(56) References Cited

U.S. PATENT DOCUMENTS

2011/0245071 A1    10/2011  Tanabe
2014/0051860 A1    2/2014   Tanabe
(Continued)

FOREIGN PATENT DOCUMENTS

EP    3 712 995 A1    9/2020
JP    2007-207662 A   8/2007
(Continued)

OTHER PUBLICATIONS

Liu et al., "Synthesis and characterization of carbon incorporated Fe-N/carbons for methanol-tolerant oxygen reduction reaction of polymer electrolyte fuel cells," Journal of Power Sources, 2014, vol. 250, pp. 279-285.
(Continued)

*Primary Examiner* — Jacob B Marks
(74) *Attorney, Agent, or Firm* — Oliff PLC

(57) ABSTRACT

A carbon catalyst, a battery electrode, and a battery each having excellent catalytic activity and excellent durability. The carbon catalyst includes iron, exhibits a weight reduction ratio in the temperature range from 200° C. to 1,200° C. of 12.0 wt % or less measured by thermogravimetric analysis in a nitrogen atmosphere, and has a carbon structure that exhibits, in X-ray absorption fine structure analysis of a K absorption edge of the iron, the following (a) and/or (b): (a) a ratio of a normalized absorbance at 7,130 eV to a normalized absorbance at 7,110 eV is 7.0 or more; and (b) a ratio of a normalized absorbance at 7,135 eV to a normalized absorbance at 7,110 eV is 7.0 or more.

9 Claims, 6 Drawing Sheets

(51) Int. Cl.
*B01J 21/18* (2006.01)
*B01J 27/24* (2006.01)
*B01J 35/10* (2006.01)
*H01M 12/08* (2006.01)

(56) References Cited

U.S. PATENT DOCUMENTS

| | | |
|---|---|---|
| 2015/0303487 A1 | 10/2015 | Kamai et al. |
| 2016/0104900 A1 | 4/2016 | Imashiro et al. |
| 2016/0190594 A1 | 6/2016 | Honma et al. |
| 2017/0194653 A1 | 7/2017 | Imashiro et al. |

FOREIGN PATENT DOCUMENTS

| | | | |
|---|---|---|---|
| JP | 2011-225431 A | | 11/2011 |
| JP | 2015-164889 A | | 9/2015 |
| WO | WO 2014-0232992 | * | 2/2014 |
| WO | 2015/020130 A1 | | 2/2015 |
| WO | 2014/006908 A1 | | 6/2016 |
| WO | 2016/088716 A1 | | 6/2016 |
| WO | 2019/097631 A1 | | 5/2019 |

OTHER PUBLICATIONS

Oct. 2, 2018 International Search Report issued in International Patent Application No. PCT/JP2018/025249.

Tian et al., "Fe-based catalysts for oxygen reduction in proton exchange membrane fuel cells with cyanamide as nitrogen precursor and/or pore-filler," Electrochimica Acta, 2011, vol. 56, pp. 3276-3285.

Vezzüet al., "Fe-carbon nitride 'Core-shell' electrocatalysts for the oxygen reduction reaction," Electrochimica Acta, 2016, vol. 222, pp. 1778-1791.

Mar. 12, 2021 Extended Search Report issued in European Patent Application No. 18831683.0.

* cited by examiner

FIG.2A

| | CATALYTIC ACTIVITY | DURABILITY | | TG WEIGHT REDUCTION RATIO (wt%) | XAFS | | | | | |
|---|---|---|---|---|---|---|---|---|---|---|
| | $i_{0.7}$ (mA/cm²) | BOL (mV) | POTENTIAL DECREASE AMOUNT (mV) | POTENTIAL MAINTENANCE RATIO (%) | | NORMALIZED ABSORBANCE | | | 7,130/7,110 RATIO | 7,135/7,110 RATIO |
| | | | | | | 7110 eV | 7130eV | 7135eV | | |
| EXAMPLE1 | -1.20 | 744 | 26 | 96.5 | 6.8 | 0.08 | 1.24 | 1.23 | 15.5 | 15.4 |
| EXAMPLE2 | -1.40 | 747 | 38 | 94.9 | 7.0 | 0.08 | 1.26 | 1.25 | 15.8 | 15.6 |
| EXAMPLE3 | -1.40 | 745 | 37 | 95.0 | 6.9 | 0.09 | 1.24 | 1.24 | 13.8 | 13.8 |
| EXAMPLE4 | -1.30 | 732 | 33 | 95.5 | 6.8 | 0.12 | 1.17 | 1.15 | 9.8 | 9.6 |
| EXAMPLE5 | -1.40 | 750 | 30 | 96.0 | 6.5 | 0.08 | 1.26 | 1.25 | 15.8 | 15.6 |
| EXAMPLE6 | -1.40 | 748 | 27 | 96.4 | 6.7 | 0.08 | 1.24 | 1.24 | 15.5 | 15.5 |
| EXAMPLE7 | -1.40 | 747 | 32 | 95.7 | 6.7 | 0.08 | 1.25 | 1.23 | 15.6 | 15.4 |
| EXAMPLE8 | -1.20 | 745 | 36 | 95.2 | 7.3 | 0.08 | 1.26 | 1.24 | 15.8 | 15.5 |
| EXAMPLE9 | -0.90 | 745 | 40 | 94.6 | 7.5 | 0.09 | 1.25 | 1.24 | 13.9 | 13.8 |
| EXAMPLE10 | -1.10 | 743 | 33 | 95.6 | 6.8 | 0.08 | 1.24 | 1.24 | 15.5 | 15.5 |
| EXAMPLE11 | -1.30 | 742 | 36 | 95.1 | 7.2 | 0.09 | 1.23 | 1.23 | 13.7 | 13.7 |
| EXAMPLE12 | -1.00 | 741 | 30 | 96.0 | 7.1 | 0.09 | 1.24 | 1.22 | 13.8 | 13.6 |
| EXAMPLE13 | -1.00 | 741 | 38 | 94.9 | 6.9 | 0.08 | 1.23 | 1.21 | 15.4 | 15.1 |
| EXAMPLE14 | -1.10 | 740 | 40 | 94.6 | 7.4 | 0.08 | 1.24 | 1.23 | 15.5 | 15.4 |
| EXAMPLE15 | -1.20 | 740 | 35 | 95.3 | 6.8 | 0.08 | 1.23 | 1.22 | 15.4 | 15.3 |
| COMPARATIVE EXAMPLE1 | -0.60 | 714 | 24 | 96.6 | 6.9 | 0.17 | 1.08 | 1.02 | 6.4 | 6.0 |
| COMPARATIVE EXAMPLE2 | -2.00 | 760 | 95 | 87.5 | 12.5 | 0.08 | 1.22 | 1.21 | 15.3 | 15.1 |
| COMPARATIVE EXAMPLE3 | -0.90 | 620 | 105 | 83.1 | 30.6 | 0.06 | 1.26 | 1.24 | 21.0 | 20.7 |
| COMPARATIVE EXAMPLE4 | – | – | – | – | 0.0 | 0.24 | 1.02 | 0.91 | 4.3 | 3.8 |
| COMPARATIVE EXAMPLE5 | -0.03 | – | – | – | 4.0 | 0.04 | 1.33 | 1.26 | 33.3 | 31.5 |

FIG.2B

| | BET SPECIFIC SURFACE AREA ($m^2/g$) | MICROPORE VOLUME ($cm^3/g$) | MESOPORE VOLUME ($cm^3/g$) | MACROPORE VOLUME ($cm^3/g$) | MESOPORE RATIO (%) | ICP-MS IRON CONTENT (wt%) | XPS | | | | ELEMENTAL ANALYSIS (COMBUSTION METHOD) | | | |
|---|---|---|---|---|---|---|---|---|---|---|---|---|---|---|
| | | | | | | | C (atm%) | O (atm%) | N (atm%) | N/C (%) | C (wt%) | H (wt%) | N (wt%) | N/C (%) |
| EXAMPLE1 | 1520 | 0.40 | 0.30 | 0.02 | 42 | 0.22 | 84.75 | 13.65 | 1.42 | 1.68 | 91.12 | 1.00 | 1.68 | 1.84 |
| EXAMPLE2 | 1680 | 0.53 | 0.29 | 0.02 | 35 | 0.28 | 86.00 | 12.39 | 1.48 | 1.72 | 87.30 | 0.65 | 1.60 | 1.83 |
| EXAMPLE3 | 1510 | 0.45 | 0.26 | 0.02 | 36 | 0.30 | 89.40 | 8.70 | 1.73 | 1.94 | 98.62 | 0.43 | 1.84 | 1.87 |
| EXAMPLE4 | 1500 | 0.45 | 0.28 | 0.02 | 37 | 0.21 | 89.10 | 9.28 | 1.50 | 1.68 | 87.65 | 1.31 | 1.73 | 1.97 |
| EXAMPLE5 | 1440 | 0.44 | 0.35 | 0.01 | 44 | 0.22 | 90.74 | 7.24 | 1.90 | 2.09 | 89.47 | 0.72 | 1.92 | 2.15 |
| EXAMPLE6 | 1540 | 0.42 | 0.34 | 0.02 | 44 | 0.21 | 89.31 | 8.56 | 1.91 | 2.14 | 90.93 | 0.68 | 1.98 | 2.18 |
| EXAMPLE7 | 1650 | 0.52 | 0.48 | 0.02 | 47 | 0.24 | 88.74 | 9.50 | 1.56 | 1.76 | 87.3 | 0.65 | 1.60 | 1.83 |
| EXAMPLE8 | 1610 | 0.47 | 0.50 | 0.01 | 51 | 0.25 | 88.62 | 9.78 | 1.42 | 1.60 | 92.84 | 1.74 | 1.47 | 1.58 |
| EXAMPLE9 | 1550 | 0.47 | 0.28 | 0.03 | 36 | 0.18 | 88.68 | 9.54 | 1.63 | 1.84 | 89.49 | 0.22 | 1.87 | 2.09 |
| EXAMPLE10 | 1690 | 0.41 | 0.57 | 0.02 | 57 | 0.20 | 87.80 | 10.30 | 1.74 | 1.98 | 92.61 | 0.78 | 1.89 | 2.04 |
| EXAMPLE11 | 1520 | 0.40 | 0.30 | 0.02 | 42 | 0.26 | 87.96 | 10.27 | 1.68 | 1.91 | 91.53 | 0.61 | 1.60 | 1.75 |
| EXAMPLE12 | 1600 | 0.50 | 0.24 | 0.02 | 32 | 0.17 | 91.12 | 7.27 | 1.48 | 1.62 | 95.07 | 0.68 | 1.50 | 1.58 |
| EXAMPLE13 | 1570 | 0.45 | 0.31 | 0.02 | 40 | 0.19 | 91.86 | 6.35 | 1.64 | 1.79 | 95.39 | 0.45 | 1.51 | 1.58 |
| EXAMPLE14 | 1500 | 0.45 | 0.26 | 0.02 | 36 | 0.21 | 91.87 | 6.26 | 1.76 | 1.92 | 79.99 | 0.46 | 1.71 | 2.14 |
| EXAMPLE15 | 1610 | 0.52 | 0.28 | 0.01 | 35 | 0.23 | 91.23 | 7.42 | 1.21 | 1.33 | 91.96 | 1.03 | 1.45 | 1.58 |
| COMPARATIVE EXAMPLE1 | 1420 | 0.44 | 0.28 | 0.02 | 38 | 0.43 | 93.43 | 4.93 | 1.54 | 1.65 | 90.43 | 1.02 | 1.55 | 1.71 |
| COMPARATIVE EXAMPLE2 | 1400 | 0.38 | 0.28 | 0.03 | 41 | 0.54 | 91.38 | 5.78 | 2.67 | 2.92 | 83.74 | 1.32 | 4.84 | 5.78 |
| COMPARATIVE EXAMPLE3 | 1180 | 0.44 | 0.09 | 0.01 | 17 | 0.28 | 86.69 | 3.01 | 10.15 | 11.71 | 72.61 | 1.53 | 15.79 | 21.75 |
| COMPARATIVE EXAMPLE4 | – | – | – | – | – | 100.00 | – | – | – | – | – | – | – | – |
| COMPARATIVE EXAMPLE5 | 90 | 0.01 | 0.13 | 0.06 | 65 | 2.70 | 92.04 | 7.61 | 0.24 | 0.26 | 90.80 | 1.23 | ICP-MS IRON CONTENT | ICP-MS IRON CONTENT |

FIG.3

| AIR CELL | POSITIVE ELECTRODE | NEGATIVE ELECTRODE | MAXIMUM OUTPUT DENSITY [mW/cm$^2$] |
|---|---|---|---|
| ZINC AIR CELL | CARBON CATALYST | ZINC | 124 |
| | CARBON BLACK | | 84 |
| MAGNESIUM AIR CELL | CARBON CATALYST | MAGNESIUM | 121 |
| | CARBON BLACK | | 76 |

FIG.4

| AIR CELL | POSITIVE ELECTRODE | NEGATIVE ELECTRODE | MAXIMUM OUTPUT DENSITY [%] |
|---|---|---|---|
| ZINC AIR CELL | CARBON CATALYST | ZINC | 89 |
| | CARBON BLACK | | 32 |
| MAGNESIUM AIR CELL | CARBON CATALYST | MAGNESIUM | 92 |
| | CARBON BLACK | | 29 |

CARBON CATALYST, CELL ELECTRODE, AND CELL

TECHNICAL FIELD

The present invention relates to a carbon catalyst, a battery electrode, and a battery.

BACKGROUND ART

Currently, as a catalyst for an electrode of a fuel cell, a platinum catalyst is used. However, there are many problems to be solved. For example, the reserves of platinum are limited. In a polymer electrolyte fuel cell (PEFC), the use of platinum increases cost. Therefore, an alternative technology that does not use platinum has been developed.

Specifically, for example, in Patent Literature 1, there is described an electrode catalyst for a fuel cell, which is formed of a carbonized material obtained by carbonizing an ion exchange resin containing a transition metal, and in which many carbon particles each having a shell-like structure with an average particle diameter of from 10 nm to 20 nm assemble in a non-aggregated state.

CITATION LIST

Patent Literature

[PTL 1] JP 2007-207662 A

SUMMARY OF INVENTION

Technical Problem

However, it has hitherto been difficult to obtain a carbon catalyst having excellent catalytic activity and excellent durability.

The present invention has been made in view of the above-mentioned problem, and one of the objects of the present invention is to provide a carbon catalyst, a battery electrode, and a battery each having excellent catalytic activity and excellent durability.

Solution to Problem

In order to solve the above-mentioned problem, a carbon catalyst according to one embodiment of the present invention includes iron, exhibits a weight reduction ratio in the temperature range from 200° C. to 1,200° C. of 12.0 wt % or less measured by thermogravimetric analysis in a nitrogen atmosphere, and includes a carbon structure that exhibits, in X-ray absorption fine structure analysis of a K absorption edge of the iron, the following (a) and/or (b): (a) a ratio of a normalized absorbance at 7,130 eV to a normalized absorbance at 7,110 eV is 7.0 or more; and (b) a ratio of a normalized absorbance at 7,135 eV to a normalized absorbance at 7,110 eV is 7.0 or more. According to the one embodiment of the present invention, a carbon catalyst having excellent catalytic activity and excellent durability is provided.

In addition, the carbon catalyst may have a ratio of a mesopore volume to a total pore volume of 20% or more. In addition, the carbon catalyst may have a content of the iron of 0.01 wt % or more measured by inductively-coupled plasma mass spectrometry.

In addition, the carbon catalyst may exhibit a nitrogen atom content of 1.0 wt % or more measured by elemental analysis based on a combustion method. In addition, the carbon catalyst may exhibit a ratio of a nitrogen atom content to a carbon atom content of 1.1% or more measured by elemental analysis based on a combustion method.

In addition, the carbon catalyst may further include a metal other than the iron. In addition, the carbon catalyst may have a specific surface area of 800 m$^2$/g or more measured by a BET method.

In order to solve the above-mentioned problem, a battery electrode according to one embodiment of the present invention includes any one of the above-mentioned carbon catalysts. According to the one embodiment of the present invention, a battery electrode including the carbon catalyst having excellent catalytic activity and excellent durability is provided.

In order to solve the above-mentioned problem, a battery according to one embodiment of the present invention includes the above-mentioned battery electrode. According to the one embodiment of the present invention, a battery including the carbon catalyst having excellent catalytic activity and excellent durability is provided.

Advantageous Effects of Invention

According to the present invention, a carbon catalyst, a battery electrode, and a battery each having excellent catalytic activity and excellent durability are provided.

BRIEF DESCRIPTION OF DRAWINGS

FIG. 2A is an explanatory diagram for showing one example of results obtained by evaluating carbon catalysts of the Examples according to one embodiment of the present invention.

FIG. 2B is an explanatory diagram for showing another example of results obtained by evaluating the carbon catalysts of the Examples according to the one embodiment of the present invention.

FIG. 3 is an explanatory diagram for showing results obtained by evaluating a maximum output density of an air cell of an Example according to one embodiment of the present invention.

FIG. 4 is an explanatory diagram for showing results obtained by evaluating an output maintenance ratio of the air cell of an Example according to the one embodiment of the present invention.

DESCRIPTION OF EMBODIMENTS

Figure 1A:
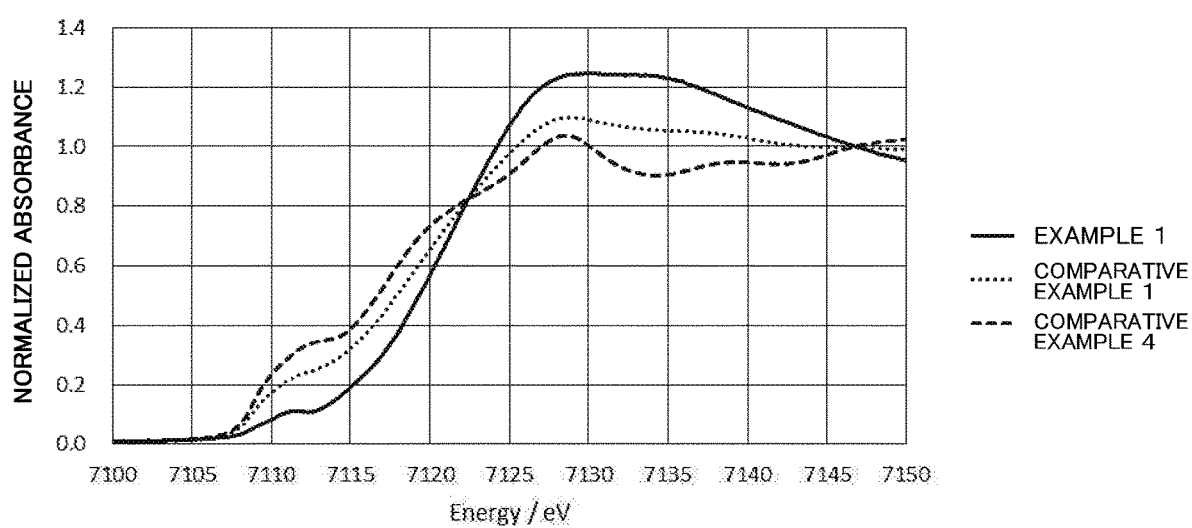
FIG. 1A is an explanatory diagram for showing one example of a result obtained by performing X-ray absorption fine structure analysis of a K absorption edge of iron in an Example according to one embodiment of the present invention.

Now, a carbon catalyst according to one embodiment of the present invention (hereinafter referred to as "catalyst of the present invention"), a battery electrode according to one embodiment of the present invention (hereinafter referred to as "electrode of the present invention"), and a battery according to one embodiment of the present invention (hereinafter referred to as "battery of the present invention")

will be described. The present invention is not limited to examples described in this embodiment.

The inventors of the present invention have undertaken extensive investigations on technical means for obtaining a carbon catalyst having excellent catalytic activity and excellent durability, and as a result, have uniquely found that a carbon catalyst, which contains iron, exhibits a weight reduction ratio measured by thermogravimetric analysis equal to or less than a predetermined threshold value, and has a carbon structure containing a large amount of iron in a particular state in X-ray absorption fine structure analysis of a K absorption edge of the iron, and has excellent catalytic activity and excellent durability, to thereby complete the present invention.

The catalyst of the present invention contains iron, exhibits a weight reduction ratio in the temperature range from 200° C. to 1,200° C. of 12.0 wt % or less measured by thermogravimetric analysis in a nitrogen atmosphere, and has a carbon structure that exhibits, in X-ray absorption fine structure (hereinafter referred to as "XAFS") analysis of a K absorption edge of the iron, the following (a) and/or (b): (a) a ratio of a normalized absorbance at 7,130 eV to a normalized absorbance at 7,110 eV is 7.0 or more; and (b) a ratio of a normalized absorbance at 7,135 eV to a normalized absorbance at 7,110 eV is 7.0 or more. The normalized absorbance in the XAFS analysis refers to an absorbance normalized so that the absorbance before an absorption edge is converged to 0, and the absorbance after the absorption edge is converged to 1.

The catalyst of the present invention contains iron derived from a raw material for carbonization at a time of production thereof described later. Specifically, the catalyst of the present invention contains iron inside, which has been contained in the raw material for carbonization. Therefore, even when the catalyst of the present invention is produced through metal removal treatment described later, a trace amount of iron derived from the raw material remains in the catalyst of the present invention.

Specifically, for example, in the case where the catalyst of the present invention has a particle shape, when the particle forming the catalyst of the present invention is cut, iron is detected on a cross section of the particle exposed by cutting. The iron contained in the catalyst of the present invention may be detected, for example, by an inductively-coupled plasma (ICP) emission spectrophotometric method.

In addition, the catalyst of the present invention exhibits a weight reduction ratio in the temperature range from 200° C. to 1,200° C. of 12.0 wt % or less measured by thermogravimetric analysis (hereinafter referred to as "TG") in a nitrogen atmosphere. The catalyst of the present invention exhibits a weight reduction ratio measured by the TG of preferably 11.0 wt % or less, more preferably 10.0 wt % or less, still more preferably 9.0 wt % or less, particularly preferably 8.0 wt % or less.

The fact that the catalyst of the present invention exhibits a weight reduction ratio equal to or less than the above-mentioned particular threshold value contributes to excellent durability of the catalyst of the present invention. Specifically, a smaller weight reduction ratio of the carbon catalyst measured by the TG in a nitrogen atmosphere indicates that the carbon catalyst is more thermally stable. For example, it is considered that the fact that the carbon catalyst is thermally stable is attributed to large binding energy between atoms forming the carbon structure of the carbon catalyst. Therefore, the carbon catalyst that is thermally stable is also electrochemically stable. The carbon catalyst that is electrochemically stable has high durability in applications such as a fuel cell. Thus, the catalyst of the present invention having a small weight reduction ratio measured by the TG in a nitrogen atmosphere exhibits excellent durability. While there is no particular limitation on a lower limit value of the weight reduction ratio of the catalyst of the present invention, the weight reduction ratio may be 1.0 wt % or more.

Further, the carbon structure of the catalyst of the present invention exhibits, in the XAFS analysis of a K absorption edge of iron, (a) a 7,130/7,110 ratio of 7.0 or more, (b) a 7,135/7,110 ratio of 7.0 or more, or (a) a 7,130/7,110 ratio of 7.0 or more and (b) a 7,135/7,110 ratio of 7.0 or more. The carbon structure of the catalyst of the present invention exhibits preferably a 7,130/7,110 ratio of 8.0 or more and/or a 7,135/7,110 ratio of 8.0 or more, particularly preferably a 7,130/7,110 ratio of 9.0 or more and/or a 7,135/7,110 ratio of 9.0 or more.

The catalyst of the present invention may be specified by appropriately combining: one of the above-mentioned threshold values for the weight reduction ratio; and one of the above-mentioned threshold values for the 7,130/7,110 ratio and/or the 7,135/7,110 ratio.

Specifically, for example, the catalyst of the present invention preferably has a carbon structure exhibiting a 7,130/7,110 ratio of 8.0 or more and/or a 7,135/7,110 ratio of 8.0 or more and exhibits a weight reduction ratio of 11.0 wt % or less, more preferably has a carbon structure exhibiting a 7,130/7,110 ratio of 8.0 or more and/or a 7,135/7,110 ratio of 8.0 or more and exhibits a weight reduction ratio of 10.0 wt % or less, still more preferably has a carbon structure exhibiting a 7, 130/7, 110 ratio of 9.0 or more and/or a 7,135/7,110 ratio of 9.0 or more and exhibits a weight reduction ratio of 9.0 wt % or less, and particularly preferably has a carbon structure exhibiting a 7,130/7,110 ratio of 9.0 or more and/or a 7,135/7,110 ratio of 9.0 or more and exhibits a weight reduction ratio of 8.0 wt % or less. While there is no particular limitation on upper limit values of the 7,130/7,110 ratio and the 7,135/7,110 ratio of the catalyst of the present invention, the 7,130/7,110 ratio and the 7,135/7,110 ratio may each be 30.0 or less.

The fact that the carbon structure of the catalyst of the present invention exhibits a 7,130/7,110 ratio equal to or more than the above-mentioned particular threshold value and/or a 7,135/7,110 ratio equal to or more than the above-mentioned particular threshold value in the XAFS analysis contributes to excellent catalytic activity of the catalyst of the present invention. Specifically, in the XAFS analysis of a K absorption edge of iron, the energy of a peak after the K absorption edge indicates energy at which an electron of a 1s orbital of an iron atom transitions to an antibonding orbital of a σ bond and reflects the binding energy of the σ bond. Meanwhile, a peak before the K absorption edge indicates that the electron of the 1s orbital of the iron atom transitions to a d orbital, which indicates that the iron atom has an asymmetric structure.

Thus, the fact that the normalized absorbances at 7,130 eV and 7,135 eV are high indicates that the iron atom has two kinds of particular bonds exhibiting energy corresponding to 7,130 eV and 7,135 eV, and the fact that the normalized absorbance at 7,110 eV is high indicates that the iron atom has an asymmetric structure.

In the catalyst of the present invention, it is considered that the iron atom having the two kinds of particular non-metallic bonds functions as one of active points. Thus, the catalyst of the present invention having the carbon structure that exhibits a 7,130/7,110 ratio and a 7,135/7,110 ratio equal to or more than the above-mentioned particular threshold values in the XAFS analysis of the K absorption edge of iron has excellent catalytic activity by containing a relatively large amount of the iron atom having the two kinds of particular non-metallic bonds.

In addition, when the carbon structure of the catalyst of the present invention exhibits a 7,130/7,110 ratio and a 7,135/7,110 ratio each falling within a range that is equal to or more than the above-mentioned particular threshold value and 30.0 or less in the XAFS analysis of iron, the two kinds of particular non-metallic bonds and the asymmetric structure of the iron atom exist with a particular balance corresponding to the above-mentioned range in the catalyst of the present invention. In this case, the catalyst of the present invention has excellent catalytic activity by containing the iron atom having the two kinds of particular non-metallic bonds and the asymmetric structure.

The catalyst of the present invention has excellent catalytic activity and excellent durability by containing iron, exhibiting a weight reduction ratio equal to or less than the above-mentioned particular threshold value, and having the carbon structure that exhibits a 7,130/7,110 ratio and/or a 7,135/7,110 ratio equal to or more than the above-mentioned particular threshold values.

The catalyst of the present invention may have a ratio of a mesopore volume to a total pore volume (hereinafter referred to as "mesopore ratio") of 20% or more. In this case, it is preferred that the mesopore ratio of the catalyst of the present invention be 25% or more. While there is no particular limitation on an upper limit value of the mesopore ratio of the catalyst of the present invention, the mesopore ratio may be, for example, 70% or less, preferably 65% or less. The mesopore ratio of the catalyst of the present invention may be specified by appropriately combining: one of the lower limit values; and one of the upper limit values. For example, the mesopore ratio is preferably 20% or more and 70% or less, particularly preferably 25% or more and 65% or less.

In this embodiment, a mesopore refers to a fine pore having a diameter of 2 nm or more and 50 nm or less, and a mesopore volume ($cm^3/g$) refers to a total volume of mesopores. In addition, a micropore refers to a fine pore having a diameter of less than 2 nm, and a micropore volume ($cm^3/g$) refers to a total volume of micropores. In addition, a macropore refers to a fine pore having a diameter of more than 50 nm, and a macropore volume ($cm^3/g$) refers to a total volume of macropores. A total pore volume ($cm^3/g$) refers to a total of the micropore volume, the mesopore volume, and the macropore volume.

The catalyst of the present invention may have a content of iron of 0.01 wt % or more measured by inductively-coupled plasma mass spectrometry (hereinafter referred to as "ICP-MS"). In this case, the content of iron of the catalyst of the present invention is preferably 0.05 wt % or more, more preferably 0.10 wt % or more, particularly preferably 0.15 wt % or more.

The content of iron measured by the ICP-MS of the catalyst of the present invention is calculated as a ratio (wt %) of the weight of the iron atom to the total weight of the catalyst of the present invention. While there is no particular limitation on an upper limit value of the content of iron of the catalyst of the present invention, the content of iron may be 10.00 wt % or less.

The catalyst of the present invention may exhibit a nitrogen atom content of 1.0 wt % or more measured by elemental analysis based on a combustion method. In this case, the catalyst of the present invention exhibits a nitrogen atom content measured by elemental analysis of preferably 1.1 wt % or more, particularly preferably 1.2 wt % or more.

The fact that the catalyst of the present invention exhibits a nitrogen atom content measured by elemental analysis equal to or more than the above-mentioned particular threshold value indicates that the catalyst of the present invention contains a relatively large amount of nitrogen atoms. While there is no particular limitation on an upper limit value of the nitrogen atom content measured by elemental analysis of the catalyst of the present invention, the nitrogen atom content measured by elemental analysis may be 10.0 wt % or less.

In addition, the catalyst of the present invention may exhibit a nitrogen atom concentration of 1.0 atm % or more measured by X-ray photoelectron spectroscopy (hereinafter referred to as "XPS") and exhibit a nitrogen atom content of 1.0 wt % or more measured by elemental analysis based on a combustion method.

In this case, the catalyst of the present invention exhibits preferably a nitrogen atom concentration measured by the XPS of 1.1 atm % or more and a nitrogen atom content measured by elemental analysis of 1.1 wt % or more, particularly preferably a nitrogen atom concentration measured by the XPS of 1.2 atm % or more and a nitrogen atom content measured by elemental analysis of 1.2 wt % or more.

The fact that the catalyst of the present invention exhibits a nitrogen atom concentration measured by the XPS equal to or more than the above-mentioned particular threshold value and a nitrogen atom content measured by elemental analysis equal to or more than the above-mentioned particular threshold value reflects that the catalyst of the present invention contains nitrogen atoms not only in a surface layer portion thereof (portion having a depth of several nm from the surface) but also in an inner portion thereof (inner portion deeper than the surface layer portion) in an amount equal to that of the surface layer portion, specifically, the catalyst of the present invention has a relatively homogeneous carbon structure from the surface layer portion to the inner portion.

In the case where the catalyst of the present invention has the relatively homogeneous carbon structure from the surface layer portion to the inner portion as described above, for example, even when an active point in the surface layer portion is lost, a decrease in catalytic activity of the catalyst of the present invention is effectively suppressed through the function of an active point in the inner portion deeper than the surface layer portion.

While there is no particular limitation on upper limit values of the nitrogen atom concentration measured by the XPS of the catalyst of the present invention and the nitrogen atom content measured by elemental analysis of the catalyst of the present invention, the nitrogen atom concentration measured by the XPS may be 10.0 atm % or less, and the nitrogen atom content measured by elemental analysis may be 10.0 wt % or less.

The catalyst of the present invention may exhibit a ratio of a nitrogen atom content to a carbon atom content, which is measured by elemental analysis based on a combustion method (hereinafter referred to as "N/C ratio measured by elemental analysis"), of 1.1% or more. In this case, the catalyst of the present invention exhibits a N/C ratio measured by elemental analysis of preferably 1.2% or more, particularly preferably 1.3% or more.

The fact that the catalyst of the present invention exhibits a N/C ratio measured by elemental analysis equal to or more than the above-mentioned particular threshold value indicates that the catalyst of the present invention contains a relatively large amount of nitrogen atoms. While there is no particular limitation on an upper limit value of the N/C ratio measured by elemental analysis of the catalyst of the present invention, the N/C ratio measured by elemental analysis of the catalyst of the present invention may be 15.0% or less.

In addition, the catalyst of the present invention may exhibit a ratio of a nitrogen atom concentration to a carbon atom concentration, which is measured by the XPS (hereinafter referred to as "N/C ratio measured by the XPS"), of 1.1% or more, and exhibit a N/C ratio of 1.1% or more measured by elemental analysis based on a combustion method.

In this case, the catalyst of the present invention exhibits preferably a N/C ratio measured by the XPS of 1.2% or more and a N/C ratio measured by elemental analysis of 1.2% or more, particularly preferably a N/C ratio measured by the XPS of 1.3% or more and a N/C ratio measured by elemental analysis of 1.3% or more.

The fact that the catalyst of the present invention exhibits a N/C ratio measured by the XPS equal to or more than the above-mentioned particular threshold value and a N/C ratio measured by elemental analysis equal to or more than the above-mentioned particular threshold value reflects that the catalyst of the present invention contains nitrogen atoms not only in a surface layer portion thereof (portion having a depth of several nm from the surface) but also in an inner portion thereof (inner portion deeper than the surface layer portion) in an amount equal to that of the surface layer portion.

In the case where the catalyst of the present invention has the relatively homogeneous carbon structure from the surface layer portion to the inner portion as described above, for example, even when an active point in the surface layer portion is lost, a decrease in catalytic activity of the catalyst of the present invention is effectively suppressed through the function of an active point in the inner portion deeper than the surface layer portion.

While there is no particular limitation on upper limit values of the N/C ratio measured by the XPS of the catalyst of the present invention and the N/C ratio measured by elemental analysis of the catalyst of the present invention, the N/C ratio measured by the XPS may be 15.0% or less, and the N/C ratio measured by elemental analysis may be 15.0% or less.

The catalyst of the present invention may further contain a metal other than iron (hereinafter referred to as "non-ferrous metal"). In this case, there is no particular limitation on the non-ferrous metal contained in the catalyst of the present invention as long as the above-mentioned characteristics of the catalyst of the present invention are obtained. It is preferred that the non-ferrous metal be a transition metal.

In this embodiment, the non-ferrous metal is a metal belonging to Groups III to XII in the periodic table, preferably a transition metal belonging to the fourth period of Groups III to XII in the periodic table. Specifically, the non-ferrous metal contained in the catalyst of the present invention may be, for example, one or more kinds selected from the group consisting of scandium (Sc), titanium (Ti), vanadium (V), chromium (Cr), manganese (Mn), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), silver (Ag), lanthanoids (e.g., one or more kinds selected from the group consisting of neodymium (Nd), samarium (Sm), and gadolinium (Gd)), and actinoids, or the group consisting of Sc, Ti, V, Cr, Mn, Co, Ni, Cu, Zn, Y, Zr, Nb, Mo, Ag, lanthanoids (e.g., one or more kinds selected from the group consisting of Nd, Sm, and Gd), and actinoids.

In addition, the catalyst of the present invention preferably contains Fe and one or more kinds of non-ferrous metals selected from the group consisting of Ti, Cr, Zn, Nd, Sm, and Gd. In this case, the catalyst of the present invention may contain, for example, Fe and Zn.

When the catalyst of the present invention contains the above-mentioned particular transition metal as the non-ferrous metal, the catalyst of the present invention may further contain another transition metal. That is, for example, when the catalyst of the present invention contains Fe and one or more kinds of first non-ferrous transition metals selected from the group consisting of Ti, Cr, Zn, Nd, Sm, and Gd, the catalyst of the present invention may further contain one or more kinds of second non-ferrous transition metals selected from the group consisting of Sc, Ti, V, Cr, Mn, Co, Ni, Cu, Y, Zr, Nb, Mo, Ru, Rh, Pd, Ag, lanthanoids (e.g., one or more kinds selected from the group consisting of Nd, Sm, and Gd), and actinoids, or the group consisting of Sc, Ti, V, Cr, Mn, Co, Ni, Cu, Zn, Y, Zr, Nb, Mo, Ag, lanthanoids (e.g., one or more kinds selected from the group consisting of Nd, Sm, and Gd), and actinoids, which are different from the first non-ferrous transition metals.

In addition, the catalyst of the present invention may be free of platinum (Pt). The catalyst of the present invention may be free of one or more kinds selected from the group consisting of platinum (Pt), ruthenium (Ru), rhodium (Rh), palladium (Pd), iridium (Ir), gold (Au), and osmium (Os).

When the catalyst of the present invention contains a non-ferrous metal derived from a raw material for carbonization described later in addition to iron, the catalyst of the present invention contains the iron and the non-ferrous metal therein, which have been contained in the raw material for carbonization. Specifically, even when the catalyst of the present invention is produced through metal removal treatment described later, trace amounts of the iron and the non-ferrous metal remain in the catalyst of the present invention.

Specifically, for example, in the case where the catalyst of the present invention containing iron and the non-ferrous metal has a particle shape, when the particle forming the catalyst of the present invention is cut, the iron and the non-ferrous metal are detected on a cross section of the particle exposed by cutting. The iron and the non-ferrous metal contained in the catalyst of the present invention may be detected, for example, by an inductively-coupled plasma (ICP) emission spectrophotometric method.

The catalyst of the present invention may have a specific surface area of 800 $m^2/g$ or more measured by a BET method. In this case, the specific surface area of the catalyst of the present invention measured by a BET method using nitrogen gas is preferably 1,000 $m^2/g$ or more, particularly preferably 1,200 $m^2/g$ or more.

The fact that the specific surface area of the catalyst of the present invention is equal to or more than the above-mentioned particular threshold value contributes to streamlining of a chemical reaction by the catalyst of the present invention, and to excellent catalytic activity. While there is no particular limitation on an upper limit value of the specific surface area of the catalyst of the present invention, the specific surface area may be 3,000 $m^2/g$ or less.

The catalyst of the present invention is formed of a carbon material having catalytic activity by itself. The carbon material forming the catalyst of the present invention is, for example, a carbonized material obtained by carbonizing a raw material containing an organic substance and iron, as described later. In addition, when the catalyst of the present invention is formed of a carbonized material obtained by carbonizing a raw material containing an organic substance, iron, and a non-ferrous metal, the non-ferrous metal is contained in the carbon structure of the catalyst of the present invention. In this case, it is considered that the catalytic activity of the catalyst of the present invention is mainly ascribed to an active point contained in the iron and the carbon structure itself rather than the non-ferrous metal. The catalytic activity of the catalyst of the present invention is, for example, oxidation activity and/or reduction activity, and more specifically, for example, oxygen reduction activity and/or hydrogen oxidation activity.

The catalyst of the present invention may be free of Pt, or the catalyst of the present invention may be free of a rare metal, such as Pt, because the catalyst of the present invention has catalytic activity by itself. However, the present invention is not limited thereto, and the catalyst of the present invention may be used as a carrier for carrying the rare metal. In this case, the rare metal carried by the catalyst of the present invention is, for example, one or more kinds selected from the group consisting of Pt, Ru, Rh, Pd, Ir, Au, and Os.

Even when the catalyst of the present invention is used as a carrier for a rare metal, the catalyst of the present invention serving as a carrier that has not carried the rare metal (catalyst of the present invention before carrying the rare metal) is a carbon material having catalytic activity by itself, that is, a carbon catalyst.

There is no particular limitation on a production method for the catalyst of the present invention as long as the carbon catalyst having the above-mentioned characteristics is obtained. In this embodiment, a method including carbonizing a raw material containing an organic substance and iron under pressure is described.

The organic substance contained in the raw material is not particularly limited as long as the organic substance can be carbonized. Specifically, as the organic substance, for example, high-molecular-weight organic compounds (e.g., resins such as a thermosetting resin and/or a thermoplastic resin), and/or low-molecular-weight organic compounds are used. In addition, a biomass may be used as the organic substance.

As the organic substance, a nitrogen-containing organic substance is preferably used. The nitrogen-containing organic substance is not particularly limited as long as the nitrogen-containing organic substance is an organic substance containing an organic compound that contains a nitrogen atom in a molecule thereof. When the catalyst of the present invention is a carbonized product of a raw material containing the nitrogen-containing organic substance, the carbon structure of the catalyst of the present invention contains a nitrogen atom.

Specifically, for example, one or more kinds selected from the group consisting of polyacrylonitrile, a polyacrylonitrile-polyacrylic acid copolymer, a polyacrylonitrile-polymethyl acrylate copolymer, a polyacrylonitrile-polymethacrylic acid copolymer, a polyacrylonitrile-polymethacrylic acid-polymethallylsulfonic acid copolymer, a polyacrylonitrile-polymethyl methacrylate copolymer, a phenol resin, polyfurfuryl alcohol, furan, a furan resin, a phenol formaldehyde resin, melamine, a melamine resin, an epoxy resin, a nitrogen-containing chelate resin (e.g., one or more kinds selected from the group consisting of polyamine-type, iminodiacetic acid-type, aminophosphoric acid-type, and aminomethylphosphonic acid-type resins), a polyamideimide resin, pyrrole, polypyrrole, polyvinylpyrrole, 3-methylpolypyrrole, acrylonitrile, polyvinylidene chloride, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic acid dihydrazide, adipic acid dihydrazide, polysulfone, polyaminobismaleimide, polyimide, polyvinyl alcohol, polyvinyl butyral, benzimidazole, polybenzimidazole, polyamide, polyester, polylactic acid, polyether, polyether ether ketone, cellulose, carboxymethyl cellulose, lignin, chitin, chitosan, pitch, lignite, silk, wool, polyamino acid, a nucleic acid, DNA, RNA, hydrazine, hydrazide, urea, salen, polycarbazole, polybismaleimide, triazine, polyacrylic acid, polyacrylic acid ester, polymethacrylic acid ester, polymethacrylic acid, polyurethane, polyamide amine, and polycarbodiimide are used as the organic substance.

The content of the organic substance in the raw material is not particularly limited as long as the catalyst of the present invention is obtained, and may be, for example, 5 mass % or more and 90 mass % or less, preferably 10 mass % or more and 80 mass % or less.

As iron to be contained in the raw material for carbonization, a simple substance of the iron and/or a compound of the iron is used. As the iron compound, for example, one or more kinds selected from the group consisting of a salt of iron, an oxide of iron, a hydroxide of iron, a nitride of iron, a sulfide of iron, a carbide of iron, and a complex of iron may be used.

While there is no particular limitation on the content of iron in the raw material as long as the content falls within a range in which the catalyst of the present invention is obtained, the content of iron may be, for example, 0.001 mass % or more and 90 mass % or less, preferably 0.002 mass % or more and 80 mass % or less.

The raw material for carbonization may further contain a non-ferrous metal. In this case, the raw material containing an organic substance, iron, and a non-ferrous metal is carbonized under pressure. When the catalyst of the present invention is a carbonized material obtained by carbonizing the raw material containing an organic substance, iron, and a non-ferrous metal, the catalyst of the present invention contains the iron and the non-ferrous metal. There is no particular limitation on the non-ferrous metal contained in the raw material as long as the characteristics of the catalyst of the present invention described above are obtained. It is preferred that the non-ferrous metal be a transition metal.

In this embodiment, the non-ferrous metal is a metal belonging to Groups III to XII in the periodic table, preferably a transition metal belonging to the fourth period of Groups III to XII in the periodic table. Specifically, the non-ferrous metal contained in the raw material may be, for example, one or more kinds selected from the group consisting of Sc, Ti, V, Cr, Mn, Co, Ni, Cu, Zn, Y, Zr, Nb, Mo, Ru, Rh, Pd, Ag, lanthanoids (e.g., one or more kinds selected from the group consisting of Nd, Sm, and Gd), and actinoids, or the group consisting of Sc, Ti, V, Cr, Mn, Co, Ni, Cu, Zn, Y, Zr, Nb, Mo, Ag, lanthanoids (e.g., one or more kinds selected from the group consisting of Nd, Sm, and Gd), and actinoids.

In addition, the raw material preferably contains Fe and one or more kinds of non-ferrous metals selected from the group consisting of Ti, Cr, Zn, Nd, Sm, and Gd. In this case, the raw material may contain Fe and Zn.

When the raw material contains the above-mentioned particular transition metal as a non-ferrous metal in addition to iron, the raw material may further contain another transition metal. That is, for example, when the raw material contains Fe and one or more kinds of first non-ferrous transition metals selected from the group consisting of Ti, Cr, Zn, Nd, Sm, and Gd, the raw material may further contain one or more kinds of second non-ferrous transition metals selected from the group consisting of Sc, Ti, V, Cr, Mn, Co, Ni, Cu, Zn, Y, Zr, Nb, Mo, Ru, Rh, Pd, Ag, lanthanoids (e.g., one or more kinds selected from the group consisting of Nd, Sm, and Gd), and actinoids, or the group consisting of Sc, Ti, V, Cr, Mn, Co, Ni, Cu, Zn, Y, Zr, Nb, Mo, Ag, lanthanoids (e.g., one or more kinds selected from the group consisting of Nd, Sm, and Gd), and actinoids, which are different from the first non-ferrous transition metals.

In addition, the raw material may be free of platinum (Pt). The raw material may be free of one or more kinds selected from the group consisting of platinum (Pt), ruthenium (Ru), rhodium (Rh), palladium (Pd), iridium (Ir), gold (Au), and osmium (Os).

As the non-ferrous metal contained in the raw material, a simple substance of the non-ferrous metal and/or a compound of the non-ferrous metal is used. As the non-ferrous metal compound, for example, one or more kinds selected from the group consisting of a salt of a non-ferrous metal, an oxide of a non-ferrous metal, a hydroxide of a non-ferrous metal, a nitride of a non-ferrous metal, a sulfide of a non-ferrous metal, a carbide of a non-ferrous metal, and a complex of a non-ferrous metal may be used.

While there is no particular limitation on the content of the non-ferrous metal in the raw material (total content of two or more kinds of non-ferrous metals when the two or more kinds of non-ferrous metals are used) as long as the content falls within a range in which the catalyst of the present invention is obtained, the content may be, for example, 1 mass % or more and 90 mass % or less, preferably 2 mass % or more and 80 mass % or less.

Carbonization is performed by heating the raw material and keeping the raw material at a temperature at which the raw material is carbonized (hereinafter referred to as "carbonizing temperature") under pressure. The carbonizing temperature is not particularly limited as long as the raw material is carbonized. The carbonizing temperature is, for example, 300° C. or more. Specifically, in this case, the raw material containing an organic substance is carbonized at a temperature of 300° C. or more under pressure.

In addition, the carbonizing temperature may be set to, for example, 700° C. or more, preferably 900° C. or more, more preferably 1,000° C. or more, and particularly preferably 1,100° C. or more. There is no particular limitation on an upper limit value of the carbonizing temperature. The carbonizing temperature is, for example, 3,000° C. or less.

A temperature increase rate up to the carbonizing temperature is, for example, 0.5° C./min or more and 300° C./min or less. The period of time for keeping the raw material at the carbonizing temperature is, for example, 1 second or more and 24 hours or less, preferably 5 minutes or more and 24 hours or less. It is preferred that the carbonization be performed in an inert gas atmosphere, such as a nitrogen atmosphere. Specifically, for example, it is preferred that the carbonization be performed under the flow of inert gas, such as nitrogen gas.

There is no particular limitation on the pressure of the atmosphere in which the carbonization is performed as long as the pressure is higher than an atmospheric pressure. The pressure is, for example, a pressure of 0.05 MPa or more in terms of a gauge pressure. Specifically, in this case, the raw material containing an organic substance is carbonized under a pressure of 0.05 MPa or more in terms of a gauge pressure.

Further, the pressure of the atmosphere in which the carbonization is performed in terms of a gauge pressure may be set to 0.10 MPa or more, 0.15 MPa or more, or 0.20 MPa or more.

The production method for the catalyst of the present invention may further include subjecting a carbonized material obtained by the above-mentioned carbonization to further treatment. Specifically, for example, the carbonized material may be subjected to metal removal treatment. In this case, the production method for the catalyst of the present invention includes carbonizing the raw material containing an organic substance under pressure, and then subjecting the carbonized material obtained by the carbonization to metal removal treatment. The metal removal treatment is treatment including reducing the amount of the metal derived from the raw material contained in the carbonized material. The metal removal treatment is, for example, washing treatment using an acid and/or electrolytic treatment.

An electrode of the present invention includes the above-mentioned catalyst of the present invention. Specifically, the electrode of the present invention is, for example, a battery electrode carrying the catalyst of the present invention. Specifically, the electrode of the present invention is, for example, a battery electrode including an electrode base material and the catalyst of the present invention carried on the electrode base material.

Here, as described above, the catalyst of the present invention has catalytic activity by itself, and hence the electrode of the present invention may be free of Pt or the above-mentioned rare metal, such as Pt. However, the present invention is not limited thereto. The electrode of the present invention may include, for example, the catalyst of the present invention serving as a carrier for carrying the rare metal and the rare metal carried by the catalyst of the present invention.

The electrode of the present invention is, for example, an electrode of a fuel cell (e.g., a polymer electrolyte fuel cell), an air cell, a water electrolytic cell (e.g., a polymer electrolyte water electrolytic cell), a redox flow cell, or a halogen cell. In addition, the electrode of the present invention is, for example, a cathode or an anode, preferably a cathode. Specifically, the electrode of the present invention is a cathode or an anode of a fuel cell, an air cell, a water electrolytic cell, a redox flow cell, or a halogen cell, preferably a fuel cell cathode, an air cell cathode, a water electrolytic cell cathode, a redox flow cell cathode, or a halogen cell cathode.

A battery of the present invention includes the above-mentioned battery electrode. Specifically, the battery of the present invention is, for example, a fuel cell (e.g., a polymer electrolyte fuel cell), an air cell, a redox flow cell, or a halogen cell including the electrode of the present invention. The battery of the present invention may include a membrane/electrode assembly (hereinafter referred to as "MEA") including the electrode of the present invention. The battery of the present invention is a battery including the electrode of the present invention as a cathode or an anode, preferably a battery including the electrode of the present invention as a cathode. Specifically, the battery of the present invention is a fuel cell, an air cell, a redox flow cell, or a halogen cell including the electrode of the present invention as a cathode or an anode, preferably a fuel cell, an air cell, a redox flow cell, or a halogen cell including the electrode of the present invention as a cathode.

Next, specific Examples according to this embodiment will be described.

EXAMPLES

Example 1

1.0 g of polyacrylonitrile (PAN), 1.0 g of 2-methylimidazole, 6.0 g of zinc chloride ($ZnCl_2$), 0.18 g of iron(III) chloride hexahydrate ($FeCl_3 \cdot 6H_2O$), and 30 g of dimethylformamide were mixed. The solvent was removed from the obtained mixture by drying. The dried mixture was heated in the atmosphere to be infusibilized at 250° C.

The infusibilized mixture was heated and kept at 1,300° C. under a gauge pressure of 0.90 MPa in a nitrogen atmosphere to be carbonized.

Dilute hydrochloric acid was added to the carbonized material obtained by the carbonization, followed by stirring. After that, the suspension containing the carbonized material was filtered through use of a membrane filter, and the carbonized material was washed with distilled water until the filtrate became neutral. Thus, metal removal treatment through washing using an acid was performed.

The carbonized material after the metal removal treatment was pulverized with a pulverizer until the median value of the particle diameters thereof became 1 μm or less. Thus, the pulverized carbonized material was obtained as a carbon catalyst of Example 1.

Example 2

A carbon catalyst of Example 2 was obtained in the same manner as in Example 1 except that the carbonization was performed under a gauge pressure of 0.45 MPa instead of 0.90 MPa.

Example 3

A carbon catalyst of Example 3 was obtained in the same manner as in Example 1 except that the carbonization was performed under a gauge pressure of 0.20 MPa instead of 0.90 MPa.

Example 4

A carbon catalyst of Example 4 was obtained in the same manner as in Example 1 except that the carbonization was performed under a gauge pressure of 0.10 MPa instead of 0.90 MPa.

Example 5

A carbon catalyst of Example 5 was obtained in the same manner as in Example 1 except that a mixture further containing 0.018 g of chromium chloride hexahydrate ($CrCl_3 \cdot 6H_2O$) was prepared before the infusibilization, and the mixture was infusibilized.

Example 6

A carbon catalyst of Example 6 was obtained in the same manner as in Example 1 except that a mixture further containing 0.06 g of boric acid ($B(HO)_3$) was prepared before the infusibilization, and the mixture was infusibilized.

Example 7

A carbon catalyst of Example 7 was obtained in the same manner as in Example 1 except that 2.0 g of 2-methylimidazole was used instead of 1.0 g of 2-methylimidazole.

Example 8

A carbon catalyst of Example 8 was obtained in the same manner as in Example 1 except that a mixture further containing 0.075 g of gadolinium nitrate hexahydrate ($Gd(NO_3)_3 \cdot 6H_2O$) was prepared before the infusibilization, and the mixture was infusibilized.

Example 9

A carbon catalyst of Example 9 was obtained in the same manner as in Example 1 except that a mixture further containing 0.69 g of germanium(IV) chloride ($GeCl_4$) was prepared before the infusibilization, and the mixture was infusibilized.

Example 10

A carbon catalyst of Example 10 was obtained in the same manner as in Example 1 except that a mixture further containing 0.06 g of palladium nitrate hexahydrate ($Pd(NO_3)_2 \cdot 6H_2O$) was prepared before the infusibilization, and the mixture was infusibilized.

Example 11

A carbon catalyst of Example 11 was obtained in the same manner as in Example 1 except that a mixture further containing 0.48 g of silver chloride (AgCl) was prepared before the infusibilization, and the mixture was infusibilized.

Example 12

A carbon catalyst of Example 12 was obtained in the same manner as in Example 1 except that a mixture further containing 0.06 g of samarium chloride hexahydrate ($SmCl_3 \cdot 6H_2O$) was prepared before the infusibilization, and the mixture was infusibilized.

Example 13

A carbon catalyst of Example 13 was obtained in the same manner as in Example 1 except that a mixture further containing 0.03 g of titanium nitride (TiN) was prepared before the infusibilization, and the mixture was infusibilized.

Example 14

A carbon catalyst of Example 14 was obtained in the same manner as in Example 1 except that a mixture further containing 0.06 g of neodymium chloride hexahydrate ($NdCl_2 \cdot 6H_2O$) was prepared before the infusibilization, and the mixture was infusibilized.

Example 15

A carbon catalyst of Example 15 was obtained in the same manner as in Example 1 except that a mixture further containing 1.06 g of bismuth(III) chloride (BiCl$_3$) was prepared before the infusibilization, and the mixture was infusibilized.

Comparative Example 1

1.0 g of polyacrylonitrile (PAN), 1.0 g of 2-methylimidazole, 6.0 g of zinc chloride (ZnCl$_2$), 0.18 g of iron (III) chloride hexahydrate (FeCl$_3$.6H$_2$O), and 30 g of dimethylformamide were mixed. The solvent was removed from the obtained mixture by drying. The dried mixture was heated in the atmosphere to be infusibilized at 250° C.

The infusibilized mixture was heated and kept at 1,300° C. under ordinary pressure in a nitrogen atmosphere to be carbonized.

Dilute hydrochloric acid was added to the carbonized material obtained by the carbonization, followed by stirring. After that, the suspension containing the carbonized material was filtered through use of a membrane filter, and the carbonized material was washed with distilled water until the filtrate became neutral. Thus, metal removal treatment through washing using an acid was performed.

The carbonized material after the metal removal treatment was pulverized with a pulverizer until the median value of the particle diameters thereof became 1 μm or less. Thus, the pulverized carbonized material was obtained as a carbon catalyst of Comparative Example 1.

Comparative Example 2

A carbon catalyst of Comparative Example 2 was obtained in the same manner as in Comparative Example 1 except that the carbonization was performed at 1,000° C. instead of 1,300° C.

Comparative Example 3

A carbon catalyst of Comparative Example 3 was obtained in the same manner as in Comparative Example 1 except that the carbonization was performed at 800° C. instead of 1,300° C.

Comparative Example 4

Powdery α-iron (iron powder manufactured by Fuji film Wako Pure Chemical Corporation) having an average particle diameter of 150 μm was used.

Comparative Example 5

0.129 g of pentaethylenehexamine, 0.075 g of iron(III) chloride hexahydrate (FeCl$_3$.6H$_2$O), and 25 mL of ethanol were mixed, followed by stirring for 24 hours, to thereby prepare a raw material for carbonization.

The obtained raw material and 0.500 g of carbon black (CABOT VXC72R) were mixed with each other. The mixture was concentrated with an evaporator and heated and kept at 800° C. for 2 hours, to thereby cause the carbon black to carry the carbonized material. Thus, a carbon catalyst of Comparative Example 5 was obtained.

[Thermogravimetric Analysis]

The weight reduction ratio of the carbon catalyst was measured by the TG in a nitrogen atmosphere through use of a differential thermal balance (TG-DTA2020SA, manufactured by Bruker AXS Inc.). Specifically, an alumina container containing 10 mg of the carbon catalyst was set in the device, and the device was then kept for 1 hour under a state in which nitrogen (200 mL/min) flowed therein at normal temperature. After that, the carbon catalyst was heated from normal temperature to 1,200° C. at a temperature increase rate of 10° C./min, and a weight reduction ratio at 200° C. to 1,200° C. was measured. In order to remove the influence of water and the like adsorbing to the carbon catalyst, a value obtained by dividing a difference, which was obtained by subtracting the weight of the carbon catalyst at 1,200° C. from the weight of the carbon catalyst at 200° C., by the weight of the carbon catalyst at 200° C. was multiplied by 100, to thereby obtain a weight reduction ratio (wt %) of the carbon catalyst.

[X-Ray Absorption Fine Structure Analysis]

The XAFS analysis of a K absorption edge of iron contained in the carbon catalyst was performed. Specifically, the XAFS analysis using a hard X-ray was performed through use of a beam line BL5S1 of Aichi Synchrotron Radiation Center (Aichi Prefecture, Japan) (Ring: 1.2 GeV/ 300.0 mA to 300.3 mA, monochromator: Si(111), beam size: 0.50 mm×0.30 mm, number of photons: $10^{10}$ at 7,000 eV, resolution (E/ΔE): 7,000 at 12 keV).

Specifically, the carbon catalyst, in which the amount thereof was adjusted so that an edge jump (difference in absorbance before and after an absorption edge) became 1, was packed in a cylinder and compressed. A sample thus produced was measured by a transmission method. However, in the case where the absorbance after the absorption edge (energy for exciting electrons bound to the orbital of an atom to the lowest unoccupied state (absorption edge energy)) exceeded 4 when the edge jump was 1, the amount of the carbon catalyst was adjusted so that the edge jump was maximized within a range in which the absorbance after the absorption edge did not exceed 4. In addition, when a bulk was small and was not suitable for measurement with the amount in which the edge jump became 1, a mixture obtained by adding boron nitride (BN) to the carbon catalyst was packed in the cylinder. The measurement range was from 6,813 eV to 8,213 eV, the step width was 0.32 eV, and the measurement time was 0.06 sec/point.

In the analysis, one kind of general XAFS analysis software "Athena" was used. (Athena Demeter 0.9.24, copyright 2006-2015 Bruce Ravel using Ifeffit 1.2.12 copyright 2008 Matt Newville, Univ of Chicago).

The normalization was performed by inputting the following numerical values to the column "Normalization and background removal parameters" in "Main window" of the analysis software "Athena". $E_0$: energy when absorbance has maximum first-order differentiation. Normalization order: 3. Pre-edge range: −150 to −30. Normalization range: 150 to 1,000. Flatten normalized data: On. The conditions were not changed from default. There is no particular limitation on the normalization as long as backgrounds before and after the absorption edge were drawn so as to pass through the center of measurement data in each region.

Figure 1B:
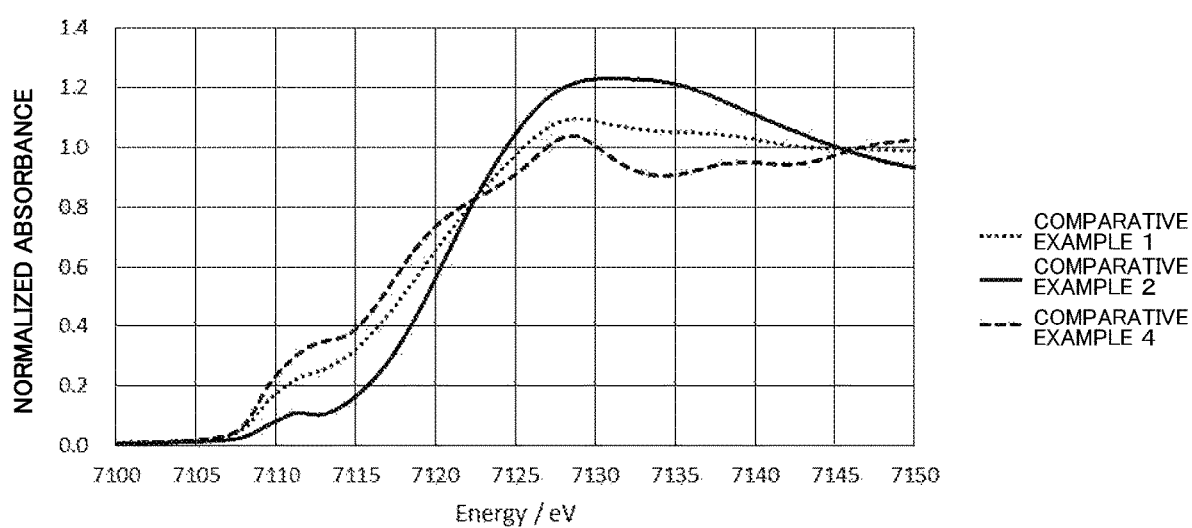
FIG. 1B is an explanatory diagram for showing another example of a result obtained by performing X-ray absorption fine structure analysis of a K absorption edge of iron in the Example according to one embodiment of the present invention.

As examples of the XAFS spectra, in FIG. 1A, there are shown XAFS spectra of the carbon catalysts obtained in Example 1 and Comparative Example 1 and an XAFS spectrum of α-iron used in Comparative Example 4, and in FIG. 1B, there are shown XAFS spectra of the carbon catalysts obtained in Comparative Examples 1 and 2 and an XAFS spectrum of α-iron used in Comparative Example 4. In FIG. 1A and FIG. 1B, the horizontal axis represents energy (eV), and the vertical axis represents a normalized absorbance.

[Specific Surface Area, Micropore Volume, Mesopore Volume, and Macropore Volume]

A specific surface area, a micropore volume, a mesopore volume, and a macropore volume of the carbon catalyst were measured through use of a specific surface area/pore distribution measurement device (Tristar 3000, manufactured by Shimadzu Corporation).

Specifically, first, 0.1 g of the carbon catalyst was kept at 100° C. and $6.7 \times 10^{-2}$ Pa for 3 hours, to thereby remove moisture adsorbing to the carbon catalyst. Then, a specific surface area ($m^2/g$) of the carbon catalyst was obtained from a nitrogen adsorption isotherm at 77 K by a BET method. The nitrogen adsorption isotherm at 77 K was obtained by measuring a change in nitrogen adsorption amount to the carbon material in association with a change in pressure of nitrogen gas at a temperature of 77 K.

Meanwhile, a macropore volume ($cm^3/g$) and a mesopore volume ($cm^3/g$) were obtained from the nitrogen adsorption isotherm at a temperature of 77 K by a BJH method. A total pore volume ($cm^3/g$) was obtained based on an adsorption amount at a point of $P/P_0=0.98$ of the nitrogen adsorption isotherm at a temperature of 77 K (P represents a pressure at a time of equilibrium, and $P_0$ represents a saturated vapor pressure ($1.01 \times 10^5$ Pa for nitrogen at 77 K). Further, a total of the macropore volume and the mesopore volume was subtracted from the total pore volume to calculate a micropore volume ($cm^3/g$). A value obtained by dividing the mesopore volume ($cm^3/g$) by the total pore volume ($cm^3/g$) was multiplied by 100 to calculate a mesopore ratio (%).

The BJH method is a typical method of obtaining a distribution of mesopores proposed by Barrett, Joyner, and Halenda (E P Barrett, L G Joyner, and P P Halenda, J Am Chem Soc, 73, 373, (1951).

[Inductively-Coupled Plasma Mass Spectrometry]

A content of iron of the carbon catalyst was measured by the ICP-MS. Specifically, 25 mg of the carbon catalyst was heated and kept in an atmospheric atmosphere at 800° C. for 3 hours to remove a non-metal component in the carbon catalyst. After that, the carbon catalyst was immersed in 5 mL of concentrated hydrochloric acid to dissolve a metal contained in the carbon catalyst. Then, distilled water was added to the resultant so that the total weight became 25 g to dilute the resultant, to thereby obtain a metal solution. An iron atom concentration of the obtained metal solution was measured through use of a sequential plasma emission spectrometer (ICP-8100, manufactured by Shimadzu Corporation).

Then, a value obtained by dividing a value, which was obtained by multiplying the iron atom concentration (mg/g) of the metal solution by the weight (25 g) of the metal solution, by the weight (25 mg) of the carbon catalyst, was multiplied by 100, to thereby calculate a content of iron (wt %) of the carbon catalyst.

[X-Ray Photoelectron Spectroscopy]

The carbon catalyst was analyzed by the XPS. Specifically, a photoelectron spectrum from each core level of a carbon atom, a nitrogen atom, and an oxygen atom on the surface of the carbon catalyst was measured through use of an X-ray photoelectron spectroscope (AXIS Nova, manufactured by Kratos). As an X-ray source, an AlKα line (10 mA, 15 kV, Pass energy: 40 eV) was used. In the obtained photoelectron spectrum, binding energy was corrected so that the peak top of the Cis peak derived from the is orbital of the carbon atom was located at 284.5 eV.

A nitrogen atom concentration (atm %), a carbon atom concentration (atm %), and an oxygen atom concentration (atm %) were obtained from the obtained photoelectron spectrum. In addition, a value obtained by dividing the nitrogen atom concentration (atm %) by the carbon atom concentration (atm %) was multiplied by 100 to calculate a N/C ratio (%) measured by the XPS.

[Elemental Analysis]

The carbon catalyst was subjected to elemental analysis based on a combustion method. Specifically, a nitrogen content of the carbon catalyst was measured by a combustion method through use of an organic trace elemental analysis device (240011, manufactured by PerkinElmer Co., Ltd.). 2 mg of the carbon catalyst was analyzed through use of helium as carrier gas under the conditions of a combustion tube temperature of 980° C. and a reduction tube temperature of 640° C.

A value obtained by dividing the weight of the nitrogen atom contained in the carbon catalyst by the total weight of the carbon catalyst was multiplied by 100 to calculate a nitrogen atom content (wt %) of the carbon catalyst.

Similarly, values obtained by dividing the weights of the carbon atom and the hydrogen contained in the carbon catalyst by the total weight of the carbon catalyst were multiplied by 100 to calculate a carbon atom content (wt %) and a hydrogen atom content (wt %), respectively. Further, a value obtained by dividing the nitrogen atom content (wt %) by the carbon atom content (wt %) was multiplied by 100 to calculate a N/C ratio (%) measured by elemental analysis.

[Catalytic Activity]

The carbon catalyst was evaluated for catalytic activity through use of a rotating ring disk electrode device (RRDE-3A rotating ring disk electrode device ver. 1.2, manufactured by BAS Inc.) and a dual electrochemical analyzer (CHI700C, manufactured by ALS Corporation). Specifically, first, a tripolar rotating ring disk electrode device including a working electrode containing the carbon catalyst was manufactured. Specifically, 5 mg of the carbon catalyst, 50 µL of 5% Nafion (trademark) (Nafion manufactured by Sigma-Aldrich, perfluorinated ion exchange resin, 5% solution (product number: 510211)), 400 µL of water, and 100 µL of isopropyl alcohol were mixed to prepare a slurry. Then, the slurry was subjected to ultrasonic treatment for 10 minutes, followed by homogenizer treatment for 2 minutes. The obtained slurry was applied onto a working electrode (ring disk electrode for RRDE-3A, platinum ring-gold disk electrode, disk diameter of 4 mm, manufactured by BAS Inc.) so that the application amount of the carbon catalyst became 0.1 $mg/cm^2$, followed by drying, to thereby manufacture a working electrode containing the carbon catalyst.

In addition, a platinum electrode (Pt counter electrode of 23 cm, manufactured by BAS Inc.) was used as a counter electrode, and a reversible hydrogen electrode (RHE) (storage type reversible hydrogen electrode manufactured by EC Frontier Co., Ltd.) was used as a reference electrode. Thus, a rotating ring disk electrode device including the working electrode containing the carbon catalyst, the platinum electrode serving as the counter electrode, and the reversible hydrogen electrode (RHE) serving as the reference electrode was obtained. In addition, as an electrolytic solution, a 0.1 M perchloric acid aqueous solution was used.

The catalytic activity was measured through use of the above-mentioned rotating ring disk electrode device. Specifically, linear sweep voltammetry ($N_2$-LSV) in a nitrogen atmosphere and linear sweep voltammetry ($O_2$-LSV) in an oxygen atmosphere were performed through use of the tripolar rotating ring disk electrode device including the working electrode containing the carbon catalyst.

In the $N_2$-LSV, first, nitrogen bubbling was performed for 10 minutes to remove oxygen in the electrolytic solution.

Then, the electrodes were rotated at a rotation speed of 1,600 rpm, and a current density was recorded as a function of a potential when potential sweep was performed at a sweep speed of 20 mV/sec.

In the $O_2$-LSV, further, oxygen bubbling was performed for 10 minutes, to thereby fill saturated oxygen into the electrolytic solution. After that, the electrodes were rotated at a rotation speed of 1,600 rpm, and a current density was recorded as a function of a potential when potential sweep was performed at a sweep speed of 20 mV/sec ($O_2$-LSV). Then, the $N_2$-LSV was subtracted from the $O_2$-LSV to obtain an oxygen reduction voltammogram. In the obtained oxygen reduction voltammogram, signs were assigned to numerical values so that a reduction current had a negative value, and an oxidation current had a positive value.

From the oxygen reduction voltammogram thus obtained, a current density $i_{0.7}$ (mA/cm$^2$) at the time of application of a voltage of 0.7 V (vs. NHE) was recorded as one indicator for indicating the catalytic activity at the time of start of a durability test of the carbon catalyst.

[Initial Performance and Durability]

A battery cathode having a catalyst layer containing the carbon catalyst formed therein was manufactured. Specifically, first, 0.25 g of the carbon catalyst produced as described above, an electrolyte solution, and 25 g of a ball were loaded into a pot and mixed with a ball mill at 200 rpm for 50 minutes, to thereby obtain a slurry-like composition for a catalyst layer containing the carbon catalyst uniformly dispersed therein.

The obtained slurry-like composition for a catalyst layer was applied onto a region having an area of 5 cm$^2$ of a gas diffusion layer ("29BC", manufactured by SGL Carbon Co., Ltd.) (2.3 cm×2.3 cm) so that the content of the carbon catalyst per unit area of a battery electrode became 1.5 mg/cm$^2$, followed by drying, to thereby form a catalyst layer on the gas diffusion layer. Thus, a battery electrode having the catalyst layer containing the carbon catalyst formed therein was obtained.

Next, the obtained battery electrode was subjected to a current retention test (durability test). Specifically, the battery electrode including the catalyst layer (positive electrode catalyst layer) manufactured as described above was used as a positive electrode. Meanwhile, a negative electrode was manufactured as described below. 0.5 g of Pt/C, 10 g of 5% Nafion (trademark), 2 g of distilled water, and 25 g of a ball were loaded into a pot and mixed with a ball mill at 200 rpm for 50 minutes, to thereby prepare a slurry-like Pt/C composition. A negative electrode including a catalyst layer (negative electrode catalyst layer) formed of the Pt/C composition was manufactured in the same manner as in the positive electrode except that the slurry-like Pt/C composition was applied onto the gas diffusion layer (5 cm$^2$) so that a Pt/C application amount per unit area became 0.3 mg/cm$^2$.

Then, a solid polymer electrolyte membrane ("Nafion (trademark) 211", manufactured by Dupont) was arranged between the positive electrode catalyst layer and the negative electrode catalyst layer, and the laminate was subjected to pressure bonding under the conditions of 150° C. and 1 MPa for 3 minutes, to thereby manufacture a MEA. A pair of gaskets was attached to the MEA, and the resultant was further sandwiched between a pair of separators, to thereby manufacture a unit cell of a fuel cell.

After that, the unit cell thus manufactured was set in a fuel cell automatic evaluation system (manufactured by Toyo Corporation) to perform a power generation test. Then, a current retention test (durability test) was performed.

In the power generation test, an open-circuit voltage was measured for 5 minutes by supplying, under a back pressure of 70 kPa, saturated humidified air (oxygen) to a positive electrode side of the unit cell at 2.5 L/min, supplying saturated humidified hydrogen to a negative electrode side of the unit cell at 1.0 L/min, and setting a cell temperature to 75° C. After that, the cell current density was retained at each current density of from 1.5 A/cm$^2$ to 0 A/cm$^2$ for 3 minutes, to thereby measure a cell voltage. In the power generation test, a potential (initial potential BOL (Beginning Of Life)) (mV) observed at a current density of 0.2 A/cm$^2$ was recorded as one indicator for indicating the catalytic activity at the time of starting the durability test of the carbon catalyst.

In the current retention test (durability test), under a back pressure of 70 kPa, saturated humidified air (oxygen) was supplied to a positive electrode side of the unit cell at 2.0 L/min, saturated humidified hydrogen was supplied to a negative electrode side of the unit cell at 0.5 L/min, and a cell temperature was set to 75° C. The current retention test (durability test) was performed by retaining the current density to be constant at 0.5 A/cm$^2$, and keeping this state for 60 hours. The durability of the battery was evaluated by this test.

After the lapse of 60 hours from the start of the current retention test (durability test), the power generation test was performed again, and the potentials observed at a current density of 0.2 A/cm$^2$ in the power generation test before and after the current retention test (durability test) were compared to each other, to thereby evaluate durability.

Specifically, a value obtained by subtracting a potential (mV) observed at a current density of 0.2 A/cm$^2$ in the power generation test after the current retention test (durability test) from a potential (mV) observed at a current density of 0.2 A/cm$^2$ in the power generation test before the current retention test (durability test) was obtained as a potential decrease amount (mV) after the lapse of 60 hours. In addition, a value obtained by dividing the potential (mV) observed at a current density of 0.2 A/cm$^2$ in the power generation test after the current retention test (durability test) by the potential (mV) observed at a current density of 0.2 A/cm$^2$ in the power generation test before the current retention test (durability test) was multiplied by 100 to calculate a potential maintenance ratio (%).

[Results]

The results obtained by evaluating the materials of Examples 1 to 15 and Comparative Examples 1 to 5 for the following are shown in FIG. 2A: a current density $i_{0.7}$ (mA/cm$^2$) and a potential BOL (mV) as the catalytic activity (initial activity) before the start of the durability test; a potential decrease amount (mV) and a potential maintenance ratio (%) after the lapse of 60 hours in the durability test; a weight reduction ratio (wt %) measured by the TG; and normalized absorbances at 7,110 eV, 7,130 eV, and 7,135 eV, and a 7,130/7,110 ratio and a 7,135/7,110 ratio measured by the XAFS. For the carbon catalyst of Comparative Example 5, the value of the current density $i_{0.7}$ (mA/cm$^2$) was significantly small, and hence the durability test was not performed.

The results obtained by evaluating the carbon catalysts obtained in Examples 1 to 15 and Comparative Examples 1 to 5 for the following are shown in FIG. 2B: a BET specific surface area (m$^2$/g); a micropore volume (cm$^3$/g); a mesopore volume (cm$^3$/g); a macropore volume (cm$^3$/g); a mesopore ratio (%); a content of iron (wt %) measured by the ICP-MS; a carbon atom concentration (atm %), an oxygen atom concentration (atm %), a nitrogen atom concentration (atm %), and a N/C ratio (%) measured by the XPS; and a carbon atom content (wt %), a hydrogen atom content (wt %), a nitrogen atom content (wt %), and a N/C ratio (%) measured by elemental analysis (combustion method).

As shown in FIG. 2A, in the carbon catalyst of Comparative Example 1, the potential decrease amount and the potential maintenance ratio in the durability test were 24 mV and 96.6%, respectively, but the current density $i_{0.7}$ and the potential BOL before the start of the durability were −0.6 mA/cm$^2$ and 714 mV, respectively. Specifically, the catalytic activity of the carbon catalyst of Comparative Example 1 was low.

In the carbon catalyst of Comparative Example 2, the current density $i_{0.7}$ and the potential BOL before the start of the durability test were −2.0 mA/cm$^2$ and 760 mV, respectively, but the potential decrease amount and the potential maintenance ratio in the durability test were 95 mV and 87.5%, respectively. That is, the durability of the carbon catalyst of Comparative Example 2 was low.

In the carbon catalyst of Comparative Example 3, the current density $i_{0.7}$ before the start of the durability test was −0.9 mA/cm$^2$, but the potential BOL before the start of the durability test was 620 mV, and the potential decrease amount and the potential maintenance ratio in the durability test were 105 mV and 83.1%, respectively. That is, the catalytic activity and durability of the carbon catalyst of Comparative Example 2 were low.

In the carbon catalyst of Comparative Example 5, the current density $i_{0.7}$ was −0.03 mA/cm$^2$. That is, the catalytic activity of the carbon catalyst of Comparative Example 5 was extremely low.

In contrast, in the carbon catalysts of Examples 1 to 15, the current density $i_{0.7}$ and the potential BOL before the start of the durability test were from −0.9 mA/cm$^2$ to −1.4 mA/cm$^2$ and from 732 mV to 750 mV, respectively, and the potential decrease amount and the potential maintenance ratio in the durability test were from 26 mV to 40 mV and from 94.6% to 96.5%, respectively. That is, the carbon catalysts of Examples 1 to 15 each had excellent catalytic activity and excellent durability.

The weight reduction ratios measured by the TG of the carbon catalysts of Comparative Examples 1 and 5 were 6.9 wt % and 4.0 wt %, respectively, and those of the carbon catalysts of Comparative Examples 2 and 3 were 12.5 wt % and 30.6 wt %, respectively. Meanwhile, the weight reduction ratios measured by the TG of the carbon catalysts of Examples 1 to 15 were each 7.5 wt % or less.

The 7,130/7,110 ratio measured by the XAFS of the carbon catalyst of Comparative Example 1 was 6.4. The 7,130/7,110 ratios measured by the XAFS of the carbon catalysts of Comparative Examples 2 and 3 were 15.3 and 21.0, respectively. The 7,130/7,110 ratio measured by the XAFS of αFe of Comparative Example 4 was 4.3. The 7,130/7,110 ratio measured by the XAFS of the carbon catalyst of Comparative Example 5 was 33.3. Meanwhile, the 7,130/7,110 ratios measured by the XAFS of the carbon catalysts of Examples 1 to 15 were from 9.8 to 15.8.

The 7,135/7,110 ratio measured by the XAFS of the carbon catalyst of Comparative Example 1 was 6.0. The 7,135/7,110 ratios measured by the XAFS of the carbon catalysts of Comparative Examples 2 and 3 were 15.1 and 20.7, respectively. The 7,135/7,110 ratio measured by the XAFS of αFe of Comparative Example 4 was 3.8. The 7,135/7,110 ratios measured by the XAFS of the carbon catalyst of Comparative Example 5 was 31.5. Meanwhile, the 7,135/7,110 ratios measured by the XAFS of the carbon catalysts of Examples 1 to 15 were from 9.6 to 15.6.

In addition, as shown in FIG. 2B, the BET specific surface areas of the carbon catalysts of Comparative Examples 1 and 2 were 1,420 m$^2$/g and 1,400 m$^2$/g, respectively. The BET specific surface area of the carbon catalyst of Comparative Example 3 was 1,180 m$^2$/g. The BET specific surface area of the carbon catalyst of Comparative Example 5 was 90 m$^2$/g. Meanwhile, the BET specific surface areas of the carbon catalysts of Examples 1 to 15 were from 1,440 m$^2$/g to 1,690 m$^2$/g.

The mesopore ratios of the carbon catalysts of Comparative Examples 1 and 2 were 38% and 41%, respectively. The mesopore ratio of the carbon catalyst of Comparative Example 3 was 17%. The mesopore ratio of the carbon catalyst of Comparative Example 5 was 65%. Meanwhile, the mesopore ratios of the carbon catalysts of Examples 1 to 15 were from 32% to 57%.

The contents of iron measured by the ICP-MS of the carbon catalysts of Comparative Examples 1 to 3 were from 0.28 wt % to 0.54 wt %. The content of iron measured by the ICP-MS of the carbon catalyst of Comparative Example 5 was 2.70 wt %. Meanwhile, the contents of iron measured by the ICP-MS of the carbon catalysts of Examples 1 to 15 were from 0.17 wt % to 0.30 wt %.

The nitrogen atom concentrations measured by the XPS of the carbon catalysts of Comparative Examples 1 to 3 were from 1.54 atm % to 10.15 atm %. The nitrogen atom concentration measured by the XPS of the carbon catalyst of Comparative Example 5 was 0.24 atm %. Meanwhile, the nitrogen atom concentrations measured by the XPS of the carbon catalysts of Examples 1 to 15 were 1.21 atm % or more.

In addition, the nitrogen atom contents measured by elemental analysis of the carbon catalysts of Comparative Examples 1 to 3 were from 1.55 wt % to 15.79 wt %. The nitrogen atom content measured by elemental analysis of the carbon catalyst of Comparative Example 5 was less than a detection limit value. Meanwhile, the nitrogen atom contents measured by elemental analysis of the carbon catalysts of Examples 1 to 15 were 1.45 wt % or more.

The N/C ratios measured by the XPS of the carbon catalysts of Comparative Examples 1 to 3 were from 1.65% to 11.71%. The N/C ratio measured by the XPS of the carbon catalyst of Comparative Example 5 was 0.26%. Meanwhile, the N/C ratios measured by the XPS of the carbon catalysts of Examples 1 to 15 were 1.33% or more.

In addition, the N/C ratios measured by elemental analysis of the carbon catalysts of Comparative Examples 1 to 3 were from 1.71% to 21.75%. The N/C ratio measured by elemental analysis of the carbon catalyst of Comparative Example 5 was less than a detection limit value. Meanwhile, the N/C ratios measured by elemental analysis of the carbon catalysts of Examples 1 to 15 were 1.58% or more.

[Manufacturing of Zinc Air Cell]

A battery electrode having a catalyst layer containing a carbon catalyst formed therein was manufactured. Specifically, first, 0.25 g of the carbon catalyst of Example 4 and an electrolyte solution were loaded into a sample bottle and treated in an ultrasonic bath for 10 minutes. After that, the resultant was stirred with a homogenizer at 25,000 rpm for 10 minutes, and further treated with an ultrasonic homogenizer at an output of 30 W and a frequency of 20 kHz for 10 minutes, to thereby obtain a slurry-like composition for a catalyst layer containing the carbon catalyst uniformly dispersed therein.

The obtained slurry-like composition for a catalyst layer was applied onto a region having an area of 9 cm² of a gas diffusion layer ("29BC", manufactured by SGL Carbon Co., Ltd.) (3.0 cm×3.0 cm) so that the content of the carbon catalyst per unit area of a battery electrode became 1.5 mg/cm², followed by drying, to thereby form a catalyst layer on the gas diffusion layer. Thus, a battery electrode having the catalyst layer containing the carbon catalyst formed therein was obtained. In addition, for comparison, a battery electrode was obtained in the same manner except that highly conductive carbon black (Ketjen black manufactured by Lion Corporation) was used instead of the carbon catalyst.

Then, a zinc air cell including the battery electrode obtained as described above was manufactured. Specifically, two aluminum laminates (manufactured by Dai Nippon Printing Co., Ltd.) each cut out to a size of 8 cm×6 cm were prepared. Part of one of the aluminum laminates was cut out to form a square window portion (2 cm×2 cm).

In addition, a nickel plate (thickness: 0.1 mm, manufactured by The Nilaco Corporation) cut out to a size of 3 cm×9 cm was prepared. A portion having a size of 2 cm×6 cm was cut off from the nickel plate, to thereby obtain an L-shaped nickel plate including a square base portion (3 cm×3 cm) and a rectangular terminal portion (1 cm×6 cm) extending from the base portion.

Then, the nickel plate was stacked on the one aluminum laminate so that the base portion of the nickel plate was exposed from the window portion of the one aluminum laminate. Further, nine holes (each having a diameter of 3 mm) that were regularly arranged were formed (three holes× three holes) as air intake holes in a portion (2 cm×2 cm) of the base portion of the nickel plate, which was exposed from the window portion of the aluminum laminate.

After that, the battery electrode was stacked on the base portion of the nickel plate so that a surface of the base portion of the nickel plate on an opposite side to the aluminum laminate and the gas diffusion layer of the battery electrode (3 cm×3 cm) obtained as described above were brought into contact with each other. Further, a thermal welding tape (manufactured by Dai Nippon Printing Co., Ltd.) was arranged so as to extend over the surrounding aluminum laminate from a frame-shaped outer peripheral portion having a width of 0.5 cm of a surface of the battery electrode on an opposite side to the nickel plate (that is, the surface of the catalyst layer). Through thermal welding of the thermal welding tape, the battery electrode, the nickel plate, and the aluminum laminate were integrated to obtain a positive electrode (air electrode).

Meanwhile, a portion having a size of 2 cm×6 cm was cut off from a copper foil (thickness: 20 μm, manufactured by Hohsen Corp.) cut out to a size of 3 cm×9 cm in the same manner as in the nickel plate, to thereby obtain an L-shaped copper foil including a square base portion (3 cm×3 cm) and a rectangular terminal portion (1 cm×6 cm) extending from the base portion. Then, the base portion of the copper foil and a zinc plate (thickness: 0.5 mm, manufactured by The Nilaco Corporation) cut out to a size of 3 cm×3 cm were welded to each other with an ultrasonic welding machine, to thereby obtain a zinc negative electrode.

After that, a cellulose separator (TF40-50, manufactured by Nippon Kodoshi Corporation) cut out to a size of 3 cm×3 cm was stacked on the surface of the catalyst layer of the positive electrode. Then, the zinc negative electrode was stacked on the cellulose separator so that a surface of the cellulose separator on an opposite side to the positive electrode and a surface of the zinc plate of the zinc negative electrode were brought into contact with each other. In this case, the nickel plate and the copper foil were arranged so that the terminal portion of the nickel plate and the terminal portion of the copper coil did not overlap with each other.

Further, the other aluminum laminate (8 cm×6 cm) was stacked on a surface of the zinc negative electrode on an opposite side to the cellulose separator (that is, the surface of the copper foil). Then, three sides out of four sides of the pair of stacked aluminum laminates were subjected to thermal welding, to thereby form an aluminum laminate bag opened on one side.

That is, in the aluminum laminate bag, the L-shaped nickel plate, the gas diffusion layer of the battery electrode, the catalyst layer of the battery electrode, the cellulose separator, the zinc plate of the zinc electrode, and the L-shaped copper foil of the zinc electrode were arranged in the stated order from the one aluminum laminate having the window portion formed therein to the other aluminum laminate.

Further, a 4 mol/L potassium hydroxide (manufactured by Hayashi Pure Chemical Ind., Ltd.) aqueous solution serving as an electrolytic solution was injected through the opening of the aluminum laminate bag. Finally, the opening of the aluminum laminate bag was closed by thermal welding to obtain a zinc air battery cell. The terminal portion of the nickel plate extending outside of the cell was utilized as a positive electrode terminal, and the terminal portion of the copper foil was utilized as a negative electrode terminal.

[Manufacturing of Magnesium Air Cell]

A magnesium air cell including the battery electrode obtained as described above was manufactured in the same manner as in the above-mentioned zinc air electrode. Specifically, an L-shaped magnesium alloy plate including a square base portion (3 cm×3 cm) and a rectangular terminal portion (1 cm×6 cm) extending from the base portion was used as a magnesium negative electrode instead of the above-mentioned zinc negative electrode, to thereby form an aluminum laminate bag having one side opened, in which the L-shaped nickel plate, the gas diffusion layer of the battery electrode, the catalyst layer of the battery electrode, the cellulose separator, and the magnesium negative electrode were arranged in the stated order from the one aluminum laminate having the window portion formed therein to the other aluminum laminate.

Then, a 4 mol/L sodium chloride (manufactured by Kanto Chemical Industry Co., Ltd.) aqueous solution serving as an electrolytic solution was injected through the opening of the aluminum laminate bag. Finally, the opening of the aluminum laminate bag was closed by thermal welding to obtain a magnesium air battery cell. The terminal portion of the nickel plate extending outside of the cell was utilized as a positive electrode terminal, and the terminal portion of the magnesium alloy plate was utilized as a negative electrode terminal.

[Evaluation of Characteristics of Air Cell]

A maximum output density of each of the zinc air cell and the magnesium air cell manufactured as described above was measured with a cell voltage of 0.5 V being set as a cut-off voltage through use of a charge/discharge device (HJ0505SM8A, manufactured by HOKUTO DENKO CORPORATION).

The configurations of the positive electrode and the negative electrode of each of the zinc air cell and the magnesium air cell and the results obtained by measuring the maximum output density (mW/cm²) thereof are shown in FIG. 3. As shown in FIG. 3, in both of the zinc air cell and the magnesium air cell, a significantly high maximum output density was obtained in the air cell including a positive electrode containing a carbon catalyst, compared to that of the air cell including a positive electrode containing carbon black. Specifically, it was confirmed that the carbon catalyst exhibited excellent catalytic activity in the air cell.

In addition, the durability of each of the zinc air cell and the magnesium air cell was evaluated. Specifically, the air cells manufactured as described above were subjected to an output characteristics test. Then, constant current discharge was performed at a current value of 10 mA/cm$^2$ up to 30% of a theoretical value. After that, the output characteristics test was performed again. Then, a value obtained by dividing an output value after the constant current discharge by an output value before the constant current discharge was multiplied by 100, to thereby calculate an output maintenance ratio (%).

The configurations of the positive electrode and the negative electrode of each of the zinc air cell and the magnesium air cell and the results obtained by measuring the output maintenance ratio (%) thereof are shown in FIG. 4. As shown in FIG. 4, in any of the zinc air cell and the magnesium air cell, a significantly high output maintenance ratio was obtained in the air cell including a positive electrode containing a carbon catalyst, compared to that of the air cell including a positive electrode containing carbon black. Specifically, it was confirmed that the carbon catalyst exhibited excellent durability in the air cell.

The invention claimed is:

1. A carbon catalyst, comprising iron, exhibiting a weight reduction ratio in the temperature range from 200° C. to 1,200° C. of 12.0 wt % or less measured by thermogravimetric analysis in a nitrogen atmosphere, and comprising a carbon structure that exhibits, in X-ray absorption fine structure analysis of a K absorption edge of the iron, the following (a) and/or (b):
   (a) a ratio of a normalized absorbance at 7,130 eV to a normalized absorbance at 7,110 eV is 7.0 or more; and
   (b) a ratio of a normalized absorbance at 7,135 eV to a normalized absorbance at 7,110 eV is 7.0 or more.

2. The carbon catalyst according to claim 1, wherein the carbon catalyst has a ratio of a mesopore volume to a total pore volume of 20% or more.

3. The carbon catalyst according to claim 1, wherein the carbon catalyst has a content of the iron of 0.01 wt % or more measured by inductively-coupled plasma mass spectrometry.

4. The carbon catalyst according to claim 1, wherein the carbon catalyst exhibits a nitrogen atom content of 1.0 wt % or more measured by elemental analysis based on a combustion method.

5. The carbon catalyst according to claim 1, wherein the carbon catalyst exhibits a ratio of a nitrogen atom content to a carbon atom content of 1.1% or more measured by elemental analysis based on a combustion method.

6. The carbon catalyst according to claim 1, further comprising a metal other than the iron.

7. The carbon catalyst according to claim 1, wherein the carbon catalyst has a specific surface area of 800 m$^2$/g or more measured by a BET method.

8. A battery electrode, comprising the carbon catalyst of claim 1.

9. A battery, comprising the battery electrode of claim 8.

* * * * *